United States Patent Office 3,146,254
Patented Aug. 25, 1964

3,146,254
TRI-BISPHENOL-A ESTER OF PHOSPHORIC ACID
Theodore S. Boozalis and Richard B. McKeever, Lake Jackson, Tex., assignors to The Dow Chemical Company, Midland, Mich., a corporation of Delaware
No Drawing. Filed June 15, 1962, Ser. No. 202,673
2 Claims. (Cl. 260—461)

This invention relates to a new compound having the formula:

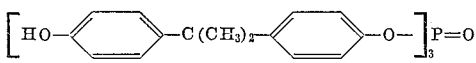

This compound may be loosely called tri-bisphenol-A phosphate and is referred to hereinafter as TBP.

TBP can be conveniently made by the reaction of $POCl_3$ with three molar equivalents of bisphenol-A. To insure that only one of the two phenolic hydroxyl groups of the bisphenol react with the acid chloride it is preferable to mix the two reactants by adding the acid chloride to the bisphenol rather than vice versa, thus assuring the presence of excess bisphenol during most of the reaction period. The reaction is conveniently conducted at or near the melting point of the bisphenol; i.e., at about 150–160° C. Solvents are not necessary, except at lower temperatures, but may be used if desired. When a solvent is used the reaction can conveniently be conducted at temperatures from 20° to 150° C. The by-product HCl can be effectively removed by sparging an inert gas into the reaction mixture, or by operation at reduced pressure or both.

The preparation of TBP is illustrated by the following examples.

Example 1

Bisphenol-A (242 g.) was placed in a reactor and heated to 155° C. Then 54.2 g. of $POCl_3$ was slowly added, with stirring, over a period of about 20 minutes, the temperature being maintained at 150–155° C. The course of the reaction was followed by anlyzing samples of the reaction mixture for chlorine content. Such samples were devolatilized before anaylsis by being heated for 30 minutes at 120° C. under an absolute pressure of 115 mm.

After a reaction time of 22 hr. no residual chloride was found in the reaction mixture. It was then devolatilized under vacuum, the residue being a brown, very viscous liquid consisting essentially of TBP and containing 4.6% of P. At 80° C. it had a density of 1.143 and a viscosity of 2336 cps.

Example 2

One mole (228.3 g.) of bisphenol-A and 1.05 m. (83 g.) of pyridine were dissolved in one liter of methylene chloride. To this solution was slowly added 0.33 m. (51.1 g.) of $POCl_3$ after which the temperature was raised to 42° C. and held there for 3 hr. The reaction mixture was then repeatedly washed with dilute HCl and then with distilled water. The solvent was then distilled to recover the product as a brown solid residue having a pour point of 60° C. and containing 4.17% P and 6.42% OH.

TBP has many uses. It is especially useful as a chemical intermediate in the production of synthetic resins and plastics. Thus, it can be condensed with epichlorohydrin to make epoxy resins; it reacts readily with alkylene oxides to produce polyether-polyols which are useful in making polyurethane and polyester resins and it reacts with polybasic acid chlorides, e.g., phosgene, to form polyester resins. It is also useful as a reactant and modifier for epoxy resins. Thus, by reaction with an epoxy resin of low equivalent weight it increases the equivalent weight to any desired degree while at the same time extending and branching the molecular chains. Such extended resins are preferred for many uses.

A particularly valuable and unexpected property of many resins containing TBP is that, despite the low phosphorus content, they are fire-resistant. The following example illustrates one such use of TBP.

Example 3

A mixture of 257 g. each of TBP and a commercial epoxy resin consisting essentially of the diglycidyl ether of bisphenol-A and containing 22.9% epoxide was heated to 105° C., whereupon 1 g. of N-methylmorpholine was added with stirring. The temperature of the mixture was then gradually raised to 158° over a 75 min. period. The resin thus prepared contained 7.4% epoxide. A portion of the resin was then cured by the addition of a 5% excess of diethylenetriamine, based on the epoxy content, and heating for 16 hr. at 25° C.

Test specimens of the resin cast in 0.5" x 0.5" x 5" molds were found to be hard and tough. They were tested for fire resistance by ASTM D–635–56T and shown to be self-extinguishing, the extent of burning being 3.5".

The following example illustrates the production of a polyester resin from the monomeric phosphate ester produced in Example 2. The molecular weight of such a resin can be controlled within wide limits by varying the proportions of the reactants.

Example 4

A solution of 0.33 mole of TBP in methylene chloride was prepared as described in Example 2. To this was added 0.4 m. of pyridine and 0.11 m. of $POCl_3$. The solution was heated for 3 hr. at 42° C., after which it was washed with dilute HCl and with water. Upon evaporation of the solvent there was left a brown solid resin having a melting point of 143° C. and containing 5.67% P and 4.84% OH.

We claim:
1. The compound having the formula:

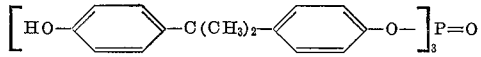

2. A process comprising reacting by contacting one mole of $POCl_3$ with about 4 moles of p-p'-isopropylidenediphenol at a temperature of about 20–160° C.

References Cited in the file of this patent
UNITED STATES PATENTS 2,058,394     Arvin _____ Oct. 27, 1936
2,931,696     Wirth et al. _____ Apr. 5, 1960

OTHER REFERENCES

Kosolapoff: Organo-Phosphorus Compounds, John Wiley and Sons, New York (1950), page 229.